United States Patent
Sarda et al.

(10) Patent No.: US 10,534,750 B1
(45) Date of Patent: Jan. 14, 2020

(54) RANGE-BASED DELETION OF SNAPSHOTS ARCHIVED IN CLOUD/OBJECT STORAGE

(71) Applicant: VMware, Inc., Palo Alto, CA (US)

(72) Inventors: Pooja Sarda, Cupertino, CA (US); Satish Kumar Kashi Visvanathan, San Jose, CA (US); Arun Kandambakkam, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/110,746

(22) Filed: Aug. 23, 2018

Related U.S. Application Data

(63) Continuation-in-part of application No. 16/035,439, filed on Jul. 13, 2018.

(51) Int. Cl.
    G06F 16/11     (2019.01)
    H04L 29/08     (2006.01)
    G06F 16/901    (2019.01)

(52) U.S. Cl.
    CPC .......... G06F 16/128 (2019.01); G06F 16/113 (2019.01); G06F 16/9027 (2019.01); H04L 67/1097 (2013.01)

(58) Field of Classification Search
    None
    See application file for complete search history.

(56) References Cited

U.S. PATENT DOCUMENTS

| | | | |
|---|---|---|---|
| 9,753,932 B1 * | 9/2017 | Brow | G06F 11/1469 |
| 10,083,088 B1 * | 9/2018 | Beeken | G06F 11/1451 |
| 10,324,803 B1 * | 6/2019 | Agarwal | G06F 11/1448 |
| 2013/0024423 A1 * | 1/2013 | Doshi | G06F 11/1448 707/640 |
| 2014/0089264 A1 * | 3/2014 | Talagala | G06F 11/1471 707/649 |
| 2017/0169038 A1 * | 6/2017 | Borate | G06F 11/1451 |

* cited by examiner

Primary Examiner — Tracy C. Chan
(74) Attorney, Agent, or Firm — Fountainhead Law Group PC

(57) ABSTRACT

According to one set of embodiments, a computer system can receive a request/command to delete a snapshot from among a plurality of snapshots of a dataset that are stored in cloud/object storage. In response, the computer system can determine a first minimum chunk identifier (ID) and a first maximum chunk ID of a range of data chunks referred to by the first snapshot, and a second minimum chunk ID and a second maximum chunk ID of a range of data chunks referred to by an immediate child snapshot of the first snapshot. The computer system can then, for each data chunk identified by a chunk ID spanning from the second minimum chunk ID to the first maximum chunk ID, check whether the data chunk is referred to by the immediate child snapshot and if not, delete the data chunk from the cloud/object storage.

21 Claims, 12 Drawing Sheets

SNAPSHOT S0

SNAPSHOT S1

SNAPSHOT S2

CHUNK 1

CHUNK 2

CHUNK 3

CHUNK 4

CHUNK 5

US 10,534,750 B1

RANGE-BASED DELETION OF SNAPSHOTS ARCHIVED IN CLOUD/OBJECT STORAGE

CROSS-REFERENCES TO RELATED APPLICATIONS

The present application is a continuation-in-part of U.S. patent application Ser. No. 16/035,439, filed Jul. 13, 2018, entitled "Archiving Data in Cloud/Object Storage Using Local Metadata Staging." In addition, the present application is related to U.S. patent application Ser. No. 16/110,942, filed concurrently herewith, entitled "Batch-Based Deletion of Snapshots Archived in Cloud/Object Storage." The entire contents of these applications are incorporated herein by reference for all purposes.

BACKGROUND

In computing, "object storage" is a data storage model that manages data in the form of containers referred to as objects, rather than in the form of files (as in file storage) or in the form of blocks (as in block storage). "Cloud/object storage" is an implementation of object storage that maintains these objects on servers that are accessible via the Internet. Examples of commercially-available cloud/object storage services include Amazon's Simple Storage Service (S3) and Google Cloud Storage.

Cloud/object storage generally offers high scalability, high durability, and relatively low cost per unit of storage capacity, which makes it an attractive solution for organizations seeking to archive large volumes of data for long-term backup and recovery purposes. However, there are a number of complexities that make it difficult to use existing cloud/object storage services as a backup target. For example, many existing cloud/object storage services can only guarantee eventual consistency to clients, which means that if an update is made to an object, all subsequent client accesses to that object will eventually, but not necessarily immediately, return the object's updated value. Some cloud/object storage services mitigate this by guaranteeing read-after-write consistency for newly created objects. But, without a stronger consistency model that also guarantees read-after-write consistency for modified objects, it is difficult to build a data backup/restore system that ensures clients have a consistent view of the archived data.

Further, the network bandwidth between an organization's on-premises (i.e., local) site and cloud/object storage is usually limited due to the need to traverse the Internet. Similarly, the latency from on-premises equipment to cloud/object storage is relatively high, and network timeouts or other network issues can be prevalent. These factors increase the costs of writing a large number of objects per backup task and can cause write throttling to occur.

DETAILED DESCRIPTION

Figure 1:
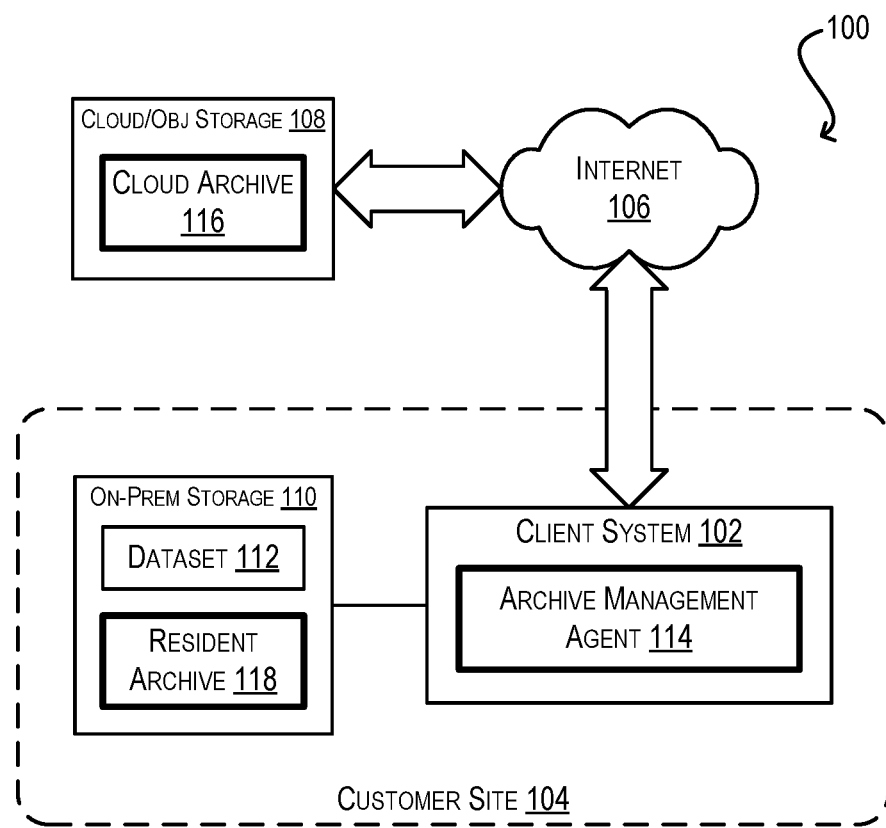
FIG. 1 depicts a system environment according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof

1. Overview

Embodiments of the present disclosure describe techniques that can be performed by a client system running at an organization's on-premises site for backing up (i.e., archiving) data from the on-premises site to cloud/object storage using a mechanism referred to as local metadata staging. According to one set of embodiments, the client system can (1) receive an initial snapshot of a source dataset (e.g., file) to be archived, (2) package the data blocks of the snapshot into fixed-sized data chunks, and (3) upload each data chunk, as it is filled with snapshot data, to the cloud/object storage. The uploaded data chunks can be appended/added to a data structure maintained on the cloud/object storage for the source dataset, referred to as the dataset's cloud archive.

Simultaneously with (2) and (3), the client system can locally stage (e.g., create and update) metadata describing the structure of the snapshot (as it is stored in cloud/object storage) in on-premises storage. This metadata, which is staged in a data structure on the on-premises storage referred to as the dataset's resident archive, can take the form of a B+ tree. The leaf nodes of the B+ tree can identify cloud physical block addresses (CBPAs) of the cloud archive where the data blocks of the snapshot are uploaded.

Then, once all of the snapshot data has been uploaded and the locally-staged snapshot metadata has been fully updated, the client system can upload the snapshot metadata (as well as archive metadata) in the form of metadata chunks to the cloud archive residing in cloud/object storage, thereby completing the archival/upload workflow for the snapshot. The client system can subsequently repeat this workflow for further snapshots of the dataset by calculating a delta between a given snapshot and the previous snapshot and uploading the data and modified metadata for the delta.

In certain embodiments, in addition to uploading snapshots to cloud/object storage in the manner described above, the client system can also implement techniques for efficiently deleting archived snapshots and their associated data chunks from cloud/object storage. Snapshot deletion is a non-trivial task when successive snapshots for a dataset are uploaded in a delta fashion, since any given snapshot may have data chunks that are referred to by one or more child snapshots. For example, assume an initial snapshot S0 is uploaded to cloud/object storage in the form of three data chunks having chunk IDs 1, 2, and 3. Data chunk 1 includes data for data blocks A and B, data chunk 2 includes data for data block C, and data chunk 3 includes data for data blocks D, E, and F. Further assume that a delta snapshot S1 is subsequently uploaded to cloud/object storage in the form of a single data chunk having chunk ID 4, which includes delta (i.e., modified) data for data block C.

In this example, delta snapshot S1 is said to "refer to" data chunks 1, 3, and 4 because, in order to restore the dataset in its entirety (i.e., data blocks A-F) from the point in time represented by S1, all three of these data chunks are needed. This is true even though data chunks 1 and 3 were uploaded as part of (i.e., belong to) snapshot S0 rather than S1. As a result, data chunks 1 and 3 cannot simply be deleted from cloud/object storage at the time of deleting S0 as long as S1 is still present; instead, a determination needs to be made regarding which data chunks of S0 are safe to delete (i.e., are not referred to by a child snapshot). It is possible to accomplish this by naively traversing all of the metadata of S1 as well as any other child snapshots, but this is a time-consuming and resource-intensive process.

To address the foregoing problem, the client system can implement a range-based deletion mechanism that examines the range of data chunks (i.e., minimum chunk ID and maximum chunk ID) referred to be each snapshot. For instance, the minimum and maximum chunk IDs referred to by snapshot S0 above are 1 and 3 respectively, and the minimum and maximum chunk IDs referred to by snapshot S1 above are 1 and 4 respectively. With this range information, the client system can quickly identify which data chunks of a given snapshot SX are safe/unsafe to delete from cloud/object storage at the time of deleting SX. In various embodiments, this range-based deletion mechanism can efficiently support both linear deletion of snapshots (i.e., deletion in age order, from oldest to newest) and nonlinear deletion of snapshots (i.e., deletion of any snapshot, regardless of its age).

Additionally, to optimize the deletion process when snapshot deletion needs to be performed on a frequent basis (e.g., deletion that is triggered by a retention policy that caps the total number of snapshots that may be maintained in cloud/object storage at a given time), the client system can also implement a batch-based deletion mechanism. With batch-based deletion, the computational and resource overhead incurred by snapshot deletion can be advantageously spaced out over longer periods of time. Further, in certain embodiments batch-based deletion can be used in conjunction with range-based deletion to make the deletion of multiple, batched snapshots more efficient than deleting each snapshot individually. These and other aspects of the present disclosure are described in further detail in the sections that follow.

2. System Environment

FIG. 1 is a simplified block diagram of a system environment 100 in which embodiments of the present disclosure may be implemented. As shown, system environment 100 includes an on-premises client system 102 at a customer (i.e., on-premises) site 104 that is connected via the Internet 106 to a cloud/object storage service/system 108. Client system 102 may be, e.g., a physical computer system or a virtual machine (VM). Cloud/object storage 108 may be any such storage service/system known in the art, such as Amazon's S3.

Although an exhaustive discussion of cloud/object storage 108 is beyond the scope of this disclosure, the following are a few salient characteristics that may be exhibited by cloud/object storage 108 in certain embodiments:

Each object in cloud/object storage 108 (also referred to herein as a "chunk") can be maintained in a flat address space and can include the data for the object itself (i.e., the object's data payload), a variable amount of object metadata, and a globally unique identifier (i.e., key).

Cloud/object storage 108 can expose a relatively simple data access API (application programming interface) to client system 102 that includes (1) a GET(k) function for retrieving an object identified by specified key k; (2) a PUT(o, k) function for creating or updating specified object o identified by specified key k; and (3) a DELETE(k) function for deleting an object identified by specified key k.

Typically, cloud/object storage 108 will be owned and maintained by a storage service provider, such as Amazon, that is distinct from the entity that owns customer site 104. However, in some embodiments, cloud/object storage 108 can be part of a private cloud that is owned/maintained by the same entity as customer site 104.

In addition to being connected to cloud/object storage 108, client system 102 is also connected to an on-premises storage system 110 that includes a dataset 112. Dataset 112 may be, e.g., virtual disk data for one or more VMs, a document repository, or any other type of dataset that is modified on an ongoing basis at customer site 104. In this environment, the goal of client system 102 is to periodically archive dataset 112 from on-premises storage 110 to cloud/object storage 108 for data protection, such that the most recently backed-up copy of dataset 112 can be restored from cloud/object storage 108 if a disaster or failure occurs that causes the on-premises copy of the dataset to be lost. However, as mentioned previously, there are a number of challenges that make it difficult to accomplish this in an efficient and performant manner (e.g., weak consistency guarantees offered by cloud/object storage 108, low bandwidth and high latency between customer site 104 and cloud/object storage 108, etc.).

To address the foregoing and other related issues, client system 102 of FIG. 1 is enhanced to include a novel archive management agent 114. In various embodiments, archive management agent 114 may be implemented in software, in hardware, or a combination thereof. In a particular embodiment, archive management agent 114 may be implemented as a user-mode application and thus can make use of certain network security protocol libraries for communicating with cloud/object storage 108, such as Transport Layer Security (TLS), that are only available in user space.

As detailed in the sections that follow, archive management agent 114 can employ techniques for archiving point-in-time copies (i.e., snapshots) of dataset 112 to cloud/object storage 108 in a manner that streams the new/modified data for each snapshot (in the form of fixed-size data chunks) to a "cloud archive" 116 in cloud/object storage 108, but stages metadata for the snapshot locally on client system 102 in a "resident archive" 118 while the snapshot data is being uploaded. This metadata can comprise a B+ tree structure whose leaf nodes point to cloud physical block addresses (CPBAs) in cloud archive 116 where each data block of the snapshot is uploaded, and whose intermediate nodes guide traversal down the tree (based on logical block addresses of dataset 112).

Then, when all of the new/modified snapshot data has been uploaded and the locally-staged snapshot metadata has been fully updated, archive management agent 114 can upload the snapshot metadata in the form of metadata chunks to cloud archive 116. Archive management agent 114 can also determine and upload archive metadata comprising information regarding the snapshot (e.g., an association between the snapshot ID and a pointer to the root node of the snapshot's B+ tree, range of data chunks referred to by the snapshot, range of metadata chunks created by the snapshot, checksums, etc.). Once this metadata upload is done, the archival/upload workflow for the snapshot is complete. Archive management agent 114 can subsequently repeat this workflow for delta changes to dataset 112 captured in further snapshots, thereby archiving those further snapshots in cloud archive 116.

With the high-level approach described above, a number of advantages can be realized. First, because the metadata for the snapshot upload is staged locally and updated/finalized in on-premises storage 110 before being sent to cloud/object storage 108, there is no need to overwrite snapshot metadata in the cloud; this metadata is uploaded exactly once for each snapshot, at the end of the archival/upload workflow (note that there will typically be a large amount of metadata "churn" during this workflow as snapshot data chunks are processed and uploaded due to the creation and splitting of B+ tree nodes). Similarly, snapshot data is always appended to (rather than overwritten in) cloud archive 116. These aspects avoid the problems raised by the eventual consistency model employed by existing cloud/object storage systems.

Second, by batching and uploading snapshot data and metadata in fixed-sized chunks (i.e., objects) rather than on a per-block basis, archive management agent 114 can more efficiently use the available bandwidth between customer site 104 and cloud/object storage 108.

Third, in certain embodiments the locally-staged metadata in resident archive 118 can be leveraged by client system 102 to accelerate archive operations, such as delete and restore. For example, client system 102/archive management agent 114 can leverage metadata pertaining to the range of data chunks referred to by each snapshot in order to more efficiently support snapshot deletion. This range-based deletion mechanism is discussed in Section 7 below.

It should be noted that two different approaches as possible for allocating local and cloud PBAs to snapshot metadata as the metadata is staged during the archival/upload workflow. According to a first approach (referred to herein as the "one-to-one mapping" approach), a particular predefined range of LPBAs may be reserved for snapshot metadata in resident archive 118 of on-premises storage 110 and an identical predefined range of cloud physical block addresses (CPBAs) may be reserved for snapshot metadata in cloud archive 116 of cloud/object storage 108. For example, a range of zero to 2 terabytes may be reserved in the LPBA space of resident archive 118 and the CPBA space of cloud archive 116 respectively. Note that the CPBA of a given block in cloud archive 116 is determined by its chunk ID, the chunk size, and offset within that chunk; for instance, if agent 114 uploads metadata to cloud archive 116 in 1 MB chunks, the CPBA of a metadata block stored at chunk 4, offset 4K will be (4×1 MB+4K)=4100K.

Then, at the time of creating/staging metadata locally in resident archive 118 during a snapshot upload, archive management agent 114 can allocate metadata blocks sequentially from the reserved LPBA range in resident archive 118 for holding the metadata, and at the time of uploading the locally staged metadata, archive management agent 114 can pack those metadata blocks according to the same sequence into chunks having sequential chunk IDs within the reserved CPBA range and upload the chunks to cloud archive 116. This effectively results in a one-to-one mapping between the LBPAs of the metadata blocks in resident archive 118 and the CPBAs of those metadata blocks in cloud archive 116, which avoids the need to perform any address translations at the time the metadata blocks are uploaded to cloud archive 116. This approach is explained in further detail in Section 3 below.

According to a second approach (referred to herein as the "arbitrary mapping" approach), there is no correspondence between the LPBAs used to store metadata blocks on-premise and the CPBAs used to store those same metadata blocks in cloud/object storage; rather, agent 114 uses any available blocks in the LPBA range of resident archive 118 to hold metadata during the local staging. As a result, once all of the metadata blocks for a given snapshot have been full updated in on-premises storage and are ready to be uploaded to cloud/object storage, agent 114 needs to identify the pointers in the B+ tree structure created for the snapshot (i.e., the pointers pointing to nodes within the B+ tree) and update those pointers to properly point to the CPBAs where those nodes will reside in the CPBA range of cloud archive 116. This approach is explained in further detail in Section 4 below.

It should be appreciated that system environment 100 of FIG. 1 is illustrative and not intended to limit embodiments of the present disclosure. For example, although only a single on-premises client system 102 is shown, any number of client systems may be configured to interact with cloud/object storage 108 for the purpose of backing up or restoring dataset 112, potentially on a concurrent basis. Further, the various entities depicted in FIG. 1 may be organized according to alternative configurations or arrangements and/or may include components or functions that are not specifically described. One of ordinary skill in the art will recognize other variations, modifications, and alternatives.

3. Initial Snapshot Upload Workflow

Figure 2A:
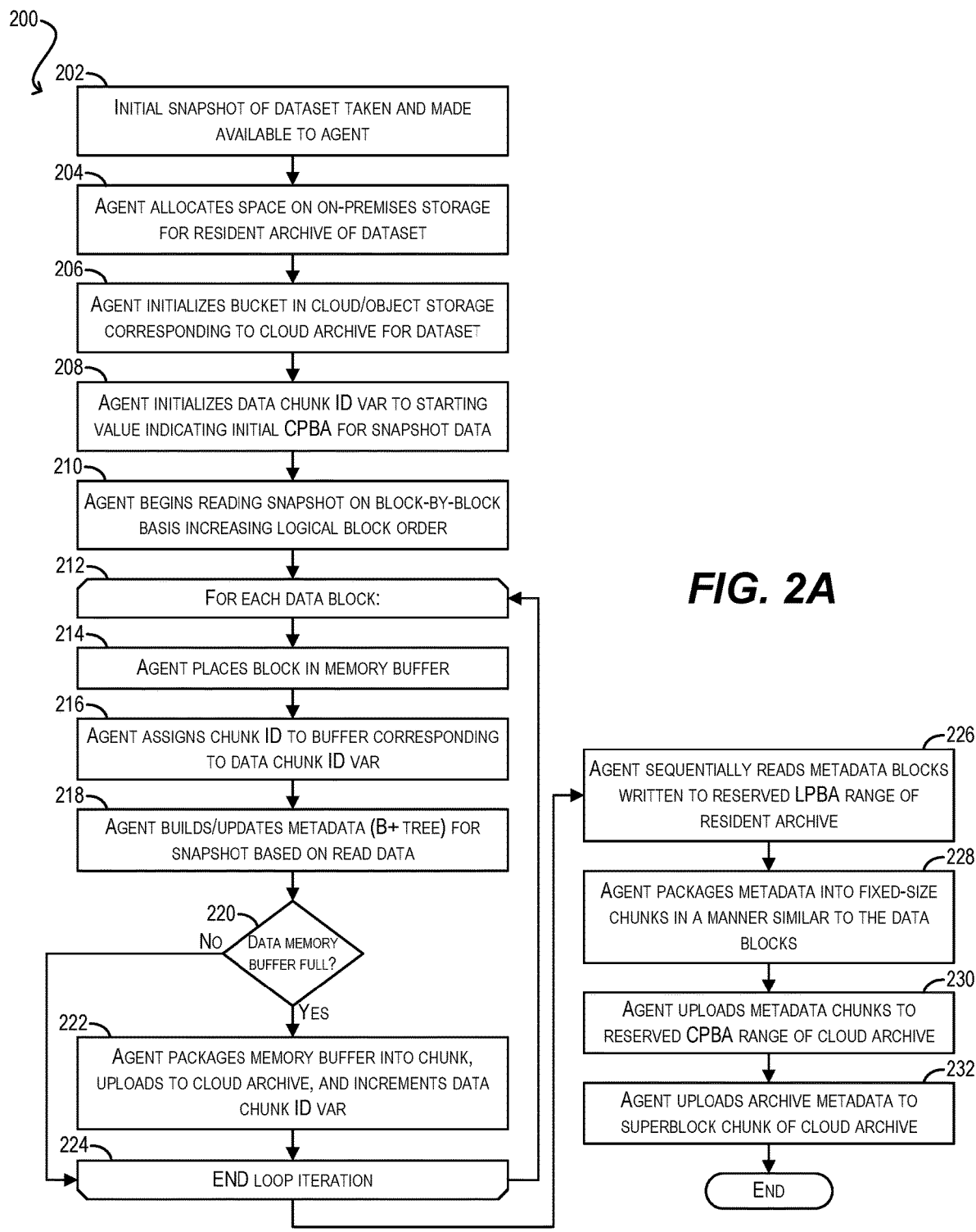
FIG. 2A depicts an initial snapshot upload workflow according to an embodiment.

FIG. 2A depicts a workflow 200 that may be executed by archive management agent 114 for uploading/archiving an initial (i.e., first) snapshot of dataset 112 to cloud/object storage 108 using local metadata staging according to an embodiment. This workflow assumes that the metadata for the snapshot will be mapped in a one-to-one manner from the LPBA of resident archive 118 to the CPBA of cloud archive 116.

Starting with step 202, an initial snapshot (e.g., snapshot S0) of dataset 112 can be taken on on-premises storage 110 and made available to archive management agent 114. Since this is the first snapshot of dataset 112, the snapshot will contain the entirety of the data of dataset 112.

At step 204, archive management agent 114 can allocate space on on-premises storage 110 for the resident archive of dataset 112 (i.e., resident archive 118), which will be used to locally stage metadata for the snapshots of dataset 112 that will be uploaded to cloud/object storage 108. The physical block address range that is allocated to resident archive 118 here is referred to as the local physical block address (LPBA) range of archive 118. As part of this step, archive management agent 114 can reserve a portion of the LPBA range for a "superblock," which is a segment of resident archive 118 that stores metadata about the archive itself (e.g., snapshots in the archive, checksums, etc.). This superblock will typically be allocated one chunk, where "chunks" are the units of data that are uploaded by agent 114 to cloud/object storage 108. In various embodiments, one chunk may have a fixed-size, such as 1 MB, 2 MB, 4 MB, etc. Archive management agent 114 can also reserve a portion of the LPBA range of resident archive 118 for storing snapshot metadata (e.g., a range of zero of 2 TB within the LPBA range).

Once archive management agent 114 has allocated space for resident archive 118 in on-premises storage 110, agent 114 can also initialize a "bucket" in cloud/object storage 108 corresponding to the cloud archive for dataset 112 (i.e., cloud archive 116) (step 206). This bucket is essentially a named container that is configured to hold cloud objects (i.e., chunks) representing the snapshot data/metadata for dataset 112 that is uploaded by agent 114. The cloud physical address space (CPBA) of cloud archive 116 starts at zero and is extended each time a chunk is written to archive 116. Thus, since an unlimited number of chunks may generally be uploaded to cloud/object storage 108, the CPBA of cloud archive 116 can potentially extend to infinity. The CPBA of a given block of data/metadata within cloud archive 116 can be calculated as chunk ID (i.e., ID of chunk in which the block resides)×chunk size+offset (i.e., offset of block within chunk).

In various embodiments, as part of step 206, archive management agent 114 can create a superblock chunk in cloud archive 116 that corresponds to the superblock allocated in resident archive 118 at step 204. In addition, archive management agent 114 can reserve a range of CPBAs (i.e., range of chunk IDs) in cloud archive 116 for snapshot metadata that is identical to the reserved metadata LPBA range in resident archive 118.

At step 208, archive management agent 114 can initialize a "data chunk ID" variable to some starting value X that corresponds to the chunk ID/location in the CPBA of cloud archive 116 where data chunks should begin being written to (this may be, e.g., the first chunk ID after the reserved metadata range). Archive management agent 114 can then begin reading the data in the initial snapshot of dataset 112, on a block-by-block basis in increasing logical block address order (step 210).

At steps 212 and 214, for each data block read from the initial snapshot, archive management agent 114 can place the data block into a memory buffer of fixed size that corresponds to the fixed-size data chunks that will be uploaded to cloud/object storage 108. For example, if agent 114 is configured to upload 4 MB chunks to cloud/object storage 108, the memory buffer will be 4 MB in size. Archive management agent 114 can assign a chunk ID to this memory buffer corresponding to the current value of the data chunk ID variable (step 216).

Further, at step 218, archive management agent 114 can build/update metadata (i.e., a B+ tree) for the initial snapshot based on the read data block and locally write this metadata to sequential blocks within the reserved metadata LPBA range of resident archive 118. The internal nodes of the B+ tree are nodes that guide tree traversal down to the leaf nodes. The leaf nodes, in turn, are configured to point to the CPBAs (i.e. chunk IDs and offsets) in cloud archive 116 where the data blocks of the snapshot will be archived. The keys of the internal nodes reflect the logical block address space of the snapshot file.

For instance, assume a new data block of the initial snapshot is placed into the memory buffer at step 214 (for upload to cloud/object storage 108). In this case, a new leaf node of the snapshot's B+ tree can be created at step 218 that includes a pointer to the CPBA of the data block (i.e., chunk ID of memory buffer x chunk size+offset) and this leaf node will be written to the next free block within the reserved metadata LPBA range of resident archive 118. Further, if the creation of the leaf node necessitates the creation of one or more parent (i.e., intermediate) nodes in the B+ tree per standard B+ tree node split criteria, such parent nodes will also be created and written sequentially into blocks in the reserved LPBA range of resident archive 118.

At step 220, archive management agent 114 can check whether the memory buffer used to hold data blocks from the snapshot has become full; if not, agent 114 can return to the start of the loop (step 212) to process the next data block. On the other hand, if the memory buffer has become full at step 220, archive management agent 114 can package the contents of the memory buffer into a data chunk, upload the data chunk (with its assigned chunk ID) to cloud archive 116 of cloud/object storage 108, and increment the data chunk ID variable (step 222) before reaching the end of the current loop iteration (step 224) and returning to the start of the loop. Although not explicitly shown, if the current data block is the last data block in the snapshot, archive management agent 114 can package and upload the contents of the memory buffer to cloud/object storage 108 even if it has not reached capacity.

Once all of the data blocks from the initial snapshot have been read and processed, archive management agent 114 can sequentially read the metadata blocks that have been written to the reserved metadata LPBA range of resident archive 118 (step 226), package the metadata blocks into fixed-size metadata chunks in a manner similar to the data blocks (step 228), and then sequentially upload these metadata chunks to the reserved CPBA range of cloud archive 116 (step 230). These metadata chunks are assigned chunk IDs that result in the LPBAs of the metadata blocks in resident archive 118 matching one-to-one with the CPBAs of the metadata blocks as they are stored in cloud archive 116. Among other things, this one-to-one mapping ensures that the internal pointers in the B+ tree represented by the metadata (i.e., pointers pointing to internal nodes in the tree) are still valid once uploaded to cloud/object storage 108, and thus the tree can be properly traversed using the cloud-archived metadata.

Finally, at step 232, archive management agent 114 can upload archive metadata to the superblock chunk in cloud archive 116 that includes, e.g., an association between the ID of the current snapshot (e.g., S0) and the PBA of the root node of the B+ tree for the snapshot (thereby allowing the metadata for the snapshot to be found and traversed), as well as potentially other archive metadata (e.g., range of metadata chunks for snapshot, range of data chunks referred to by the snapshot, checksums, etc.). Once this is completed, the archival/upload process for the snapshot is done and the workflow can end.

Figure 2B:
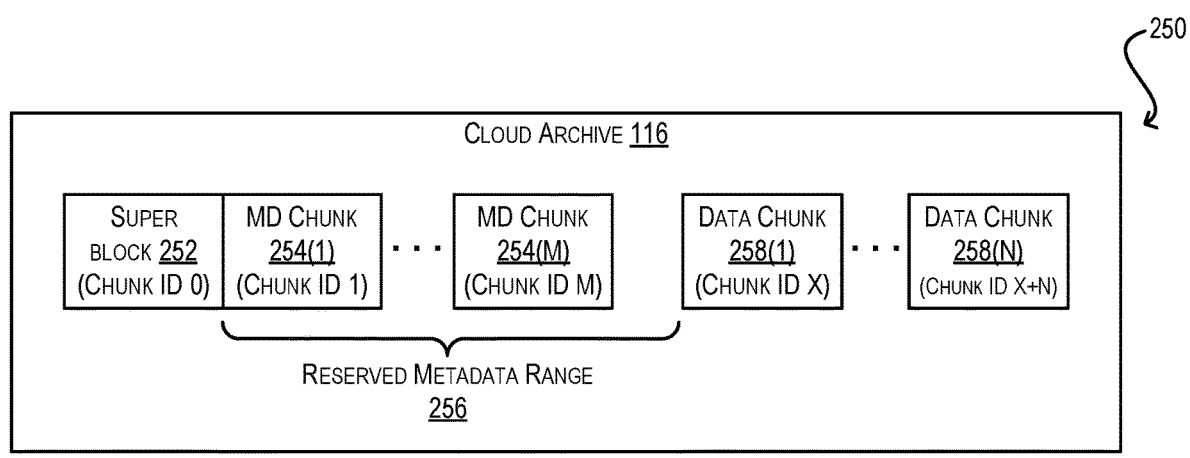
FIG. 2B depicts an example structure of a cloud archive after the initial snapshot workflow of FIG. 2A according to an embodiment.

FIG. 2B is a diagram 250 that illustrates the contents of cloud archive 116 at the conclusion of upload workflow 200 according to an embodiment. As shown in diagram 250, cloud archive 116 includes a superblock chunk 252 (associated with chunk ID 0), a number of metadata chunks 254(1)-(M) for the uploaded snapshot (associated with chunk IDs 1 to M within reserved metadata range 256), and a number of data chunks 258(1)-(N) (associated with chunk IDs X to X+N, where X is the first chunk ID after the end of reserved metadata range 256). In this example, the CPBA of cloud archive extends from zero to (X+N)×S, where S is the fixed size of each metadata/data chunk. This CPBA will be extended further as new chunks are uploaded to cloud archive 116 for subsequent delta snapshots of dataset 112.

4. Alternative Metadata Mapping (Arbitrary)

Figure 3:
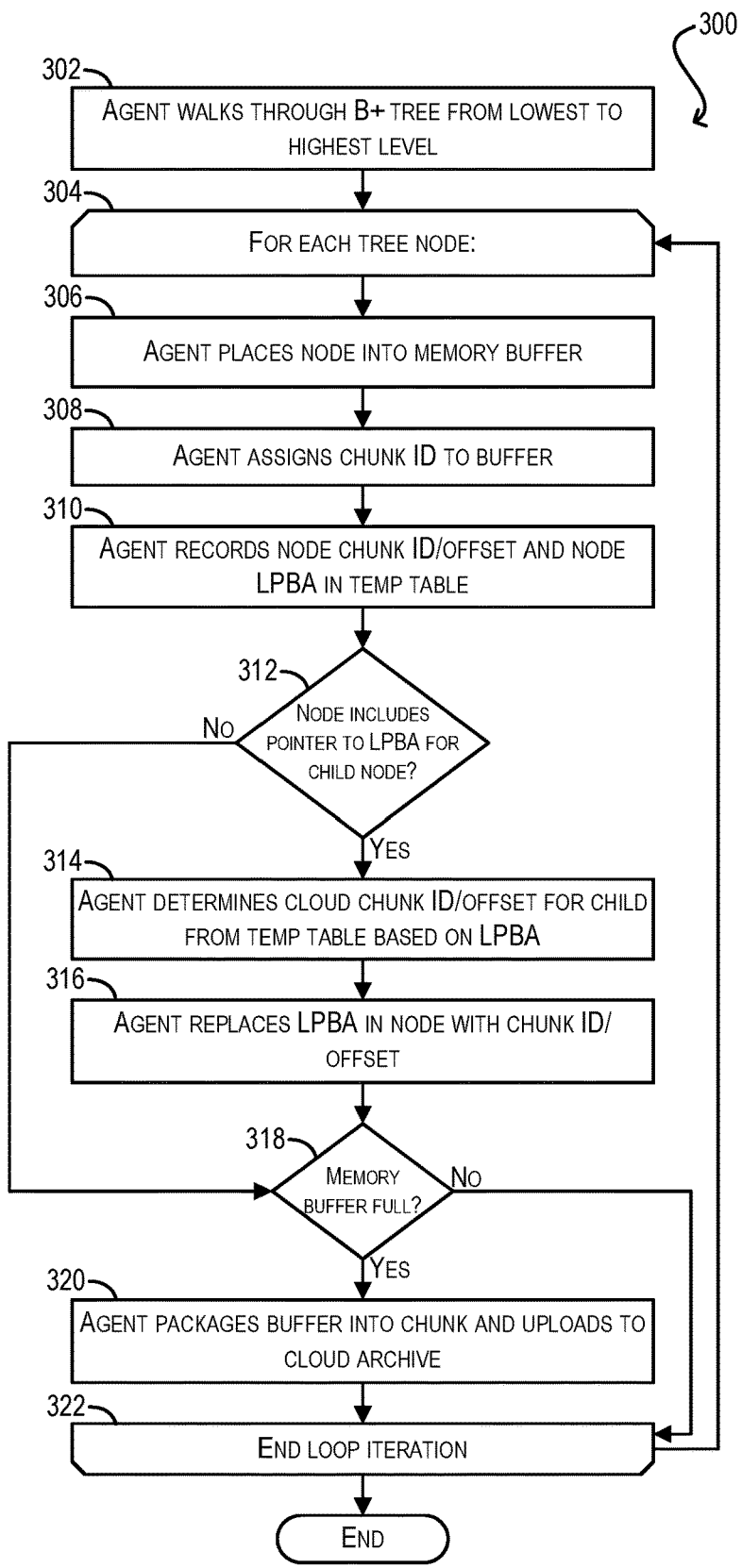
FIG. 3 depicts a workflow for staging snapshot metadata using an arbitrary mapping approach according to an embodiment.

As mentioned previously, as an alternative to performing one-to-one mapping of metadata between the LPBA of resident archive 118 and the CPBA of cloud archive 116, archive management agent 114 can instead arbitrarily allocate blocks for metadata from the LPBA during local metadata staging. With this alternative approach, there is no reserved address range for metadata in the LPBA or CPBA; instead, as agent 114 is building the B+ tree for the snapshot, the agent can allocate blocks from anywhere in the LPBA and use those allocated blocks to hold the B+ tree data (i.e., node information). Then, when all data chunks have been sent to the cloud, archive management agent 114 can perform a process for uploading the metadata to cloud/object storage 108 that includes translating metadata pointers that point to LPBAs (i.e., pointers to internal tree nodes) to instead point to appropriate CPBAs where the metadata will be uploaded. FIG. 3 depicts a workflow 300 of this metadata upload process according to an embodiment.

Starting with step 302, archive management agent 114 can walk through the B+ tree created/built during the data upload phase of archival workflow 200, from the lowest to highest level in tree.

For each encountered tree node (step 304), archive management agent 114 can place the node into a fixed-size memory buffer corresponding to the size of a single metadata chunk (step 306) and can assign a chunk ID to this buffer (step 308). Agent 114 can start this chunk ID at the last value of the data chunk ID variable described earlier, such that metadata chunks are written to the CPBA immediately following the data chunks for the snapshot.

At step 310, archive management agent 114 can record the current chunk ID and offset for the node within the chunk in a temporary mapping table. This mapping table can associate the cloud chunk ID/offset for the node with the node's LPBA in resident archive 118.

Then, if the node includes a pointer to a LPBA for a child node in the B+ tree (step 312), archive management agent 114 can determine the cloud chunk ID/offset for that child node from the temporary mapping table based on its LBPA (step 314) and can replace the LPBA with the chunk ID/offset in the node, thereby translating the LPBA to a CPBA (i.e., chunk ID/offset) (step 316).

Finally, if the memory buffer is now full (step 318), archive management agent 114 can upload the contents of the memory buffer as a metadata chunk (with its assigned chunk ID) to cloud archive 116 in cloud/object storage 108, thereby archiving it there (step 320). The current loop iteration can then end (step 322) and archive management agent 114 can return to the top of the loop (step 302) and repeat this process until all tree nodes have been processed.

With workflow 300, the structure of cloud archive 116 shown in FIG. 2B will be slightly different since there is no reserved metadata range 256; instead, the metadata chunks for the uploaded snapshot (254(1)-(M)) will appear in the CPBA after data chunks 258(1)-(N).

5. Delta Snapshot Upload Workflow

Figure 4:
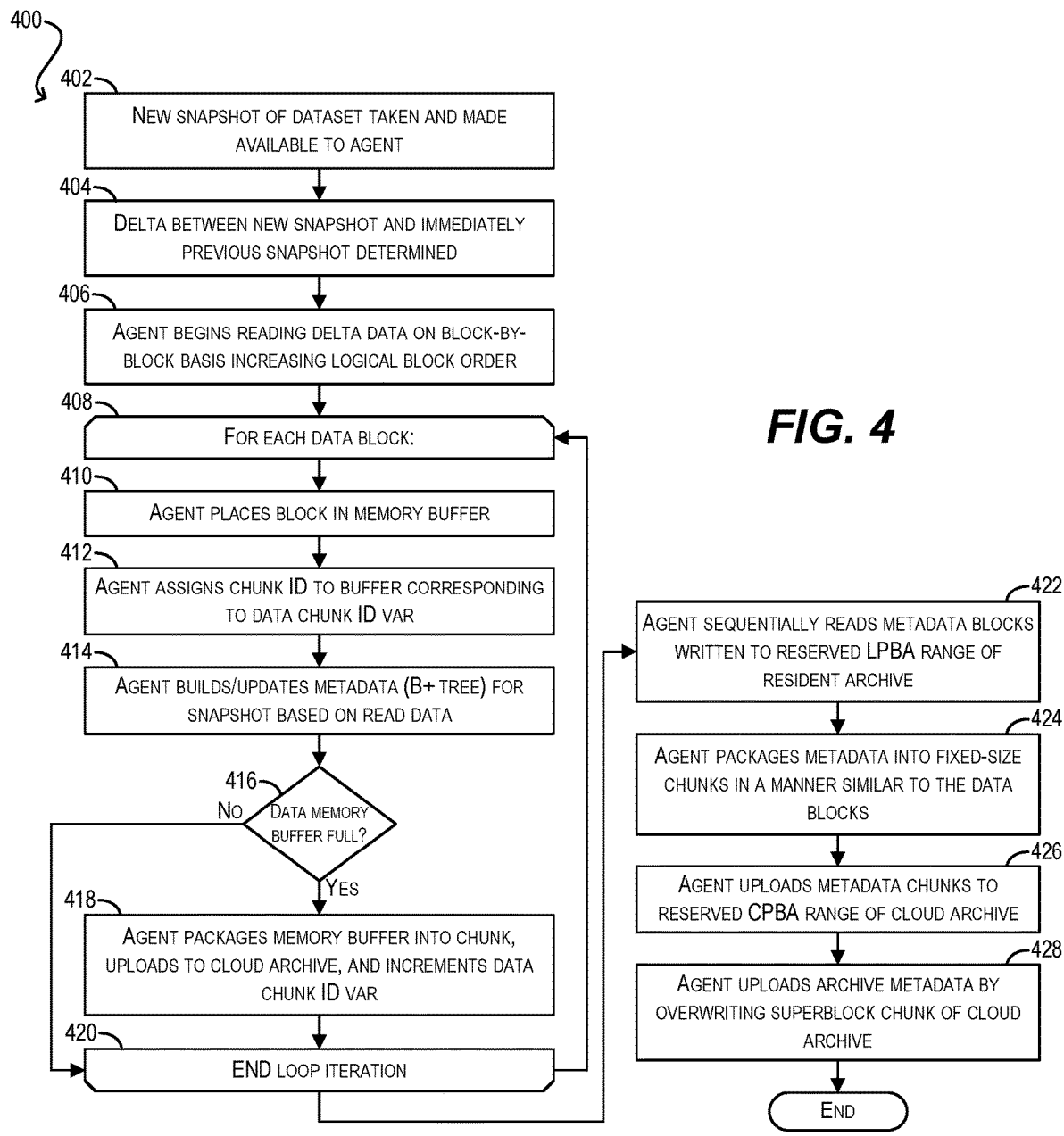
FIG. 4 depicts a delta snapshot upload workflow according to an embodiment.

FIG. 4 depicts a workflow 400 that may be executed by archive management agent 114 for uploading/archiving a delta (e.g., second or later) snapshot of dataset 112 to cloud/object storage 108 using local metadata staging according to an embodiment. This workflow assumes that at least one snapshot of dataset 112 has already been uploaded per workflow 200 of FIG. 2A and now a second snapshot needs to be uploaded that captures changes to dataset 112 since the first snapshot.

The steps of workflow 400 are largely similar to workflow 200; however, rather than starting with an initial snapshot of dataset 112, a new snapshot of the dataset is taken at block 402 and a delta between the new snapshot and the immediately previous snapshot (i.e., the data blocks that have changed between the two snapshots) is determined at block 404. This delta is then read by archive management agent 114 and processed at subsequent blocks 406-428 in a manner that is analogous to blocks 210-232 of workflow 200.

It should be noted that, as part of building the B+ tree for the delta snapshot data, archive management agent 114 can reuse the nodes of B+ trees of previous snapshot(s) (in other words, point to existing tree nodes of previous snapshot(s) for portions of the tree that have not changed). For portions of the B+ tree that do need to be modified for the delta snapshot data, archive management agent 114 can employ copy-on-write to create new copies of those specific nodes.

In addition, it should be noted that at step 428 archive management agent 114 overwrites the existing superblock chunk in cloud archive 116 in order to update it with the metadata for the current snapshot (e.g., snapshot ID and pointer to the root node of the snapshot's B+ tree). As mentioned previously, performing such overwrites in cloud/object storage 108 can raise consistency issues since most cloud/object storage systems only guarantee eventual consistency. One mechanism for managing this issue is addressed in the next section below.

6. Managing Overwrites to Superblock Chunk

Per block 428 of workflow 400, archive management agent 114 overwrites the superblock chunk in cloud archive 116 at the conclusion of the snapshot archival/upload process in order to update the superblock with metadata regarding the uploaded snapshot (e.g., snapshot ID and pointer to snapshot's B+ tree root node). Since overwrites are only eventually consistent in most cloud/object storage systems, this can cause numerous problems when the superblock needs to be accessed again for various archive operations. For example, consider a scenario where a client wishes to restore the most recently archived snapshot of dataset 112 (e.g., snapshot S100). In this case, the client will read the superblock chunk of cloud archive 116, which was updated with information regarding S100 during the last upload workflow. However, assuming cloud/object storage 108 is only eventually consistent, the read (i.e., GET) operation requested by the client may return an older version of the superblock that identifies a snapshot that is older than the most recent snapshot (e.g., snapshot S90). Thus, the client may begin restoring from older snapshot S90 under the erroneous belief that it is restoring the latest version of the data.

Figure 5A:
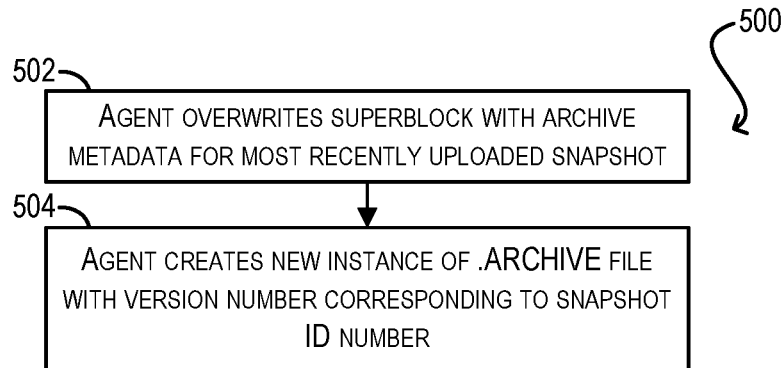
FIGS. 5A and 5B depict workflows for managing overwrites to the superblock chunk of a cloud archive according to an embodiment.
Figure 5B:
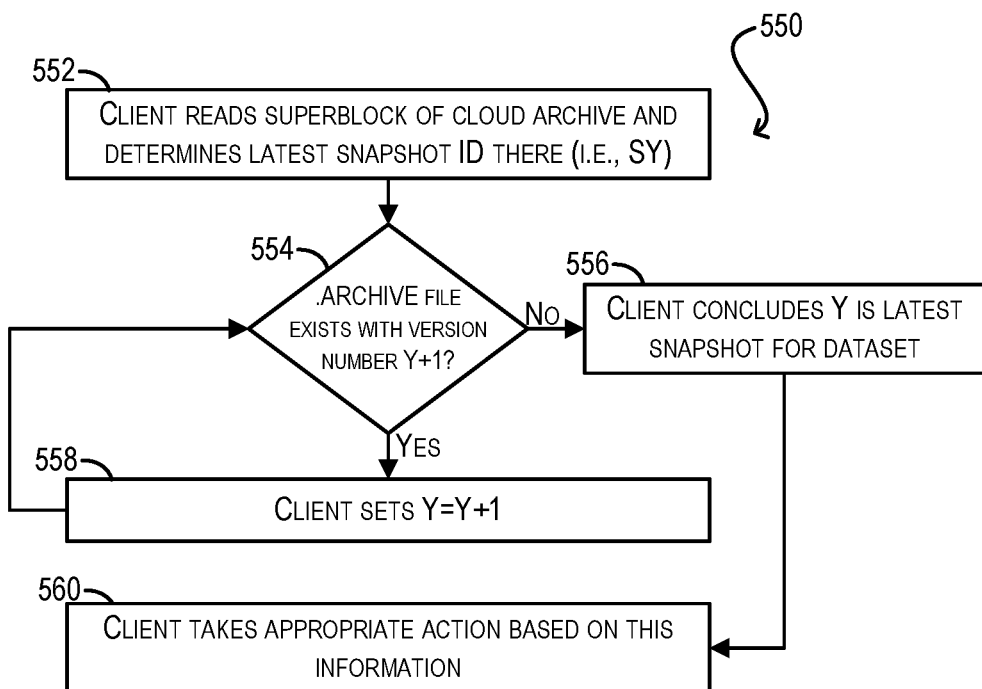

To address this, FIG. 5A depicts a workflow 500 that can be performed by archive management agent 114 at the time of overwriting the superblock chunk in cloud archive 116 and FIG. 5B depicts a complementary workflow 500 that can be performed by a client at the time of accessing the superblock in order to identify the most recently uploaded snapshot. Taken together, these two workflows can ensure that the client can always correctly determine the most recent snapshot in cloud archive 116, despite the eventual consistency property of cloud/object storage 108 (this solution assumes that cloud/object storage 108 supports read-after-write consistency for newly created objects).

Starting with step 502 of workflow 500, archive management agent 114 can overwrite (i.e., update) the superblock chunk of cloud archive 116 with archive metadata for the most recently uploaded snapshot. This archive metadata can include an identifier of the snapshot and a pointer (e.g., chunk ID and offset) to the root node of the snapshot's B+ tree. This step is substantially similar to step 428 of workflow 400.

Figure 5C:
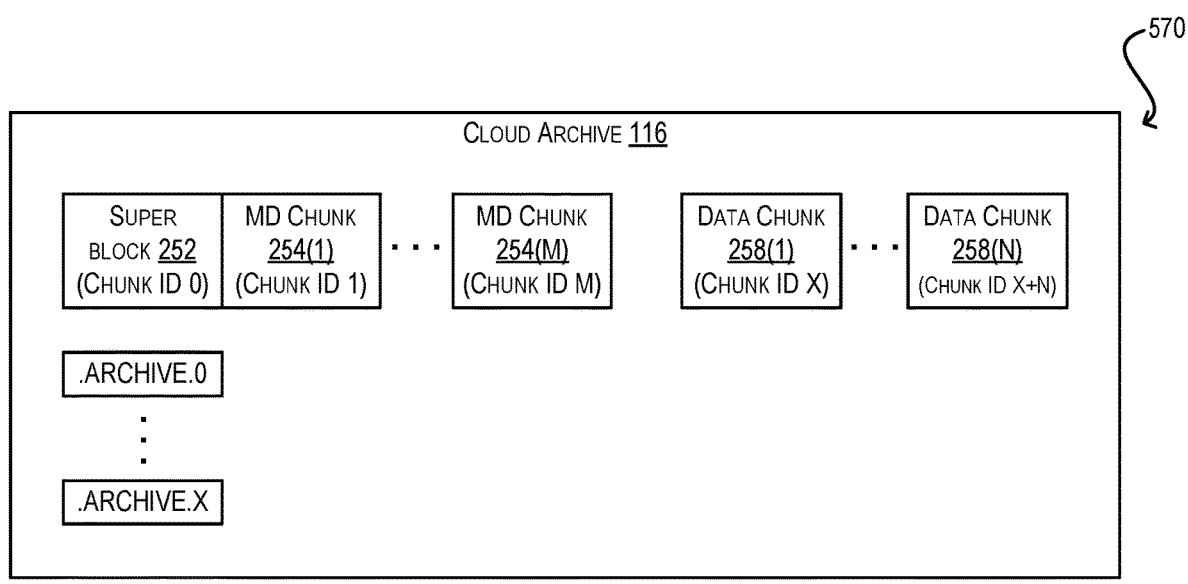
FIG. 5C depicts an example structure of a cloud archive after the creation of one or more .ARCHIVE files for the superblock chunk according to an embodiment.

However, rather than simply overwriting the superblock chunk, archive management agent 114 can also create a new instance of a special file in cloud archive 116 (referred to as a ".ARCHIVE" file) that has a version number corresponding to the snapshot ID number (step 504). For example, if the most recently uploaded snapshot is SX, the .ARCHIVE file created at block 504 will have a version number X (e.g., .ARCHIVE.X). This newly created file version will be readable by all clients immediately after its creation under the property of read-after-write consistency. This is illustrated in diagram 570 of FIG. 5C, which shows cloud archive 116 with .ARCHIVE files ARCHIVE.0 to ARCHIVE.X (one file for each uploaded snapshot S0 to SX). In various embodiments, these .ARCHIVE files do not contain any data content of substance; instead, the reason for creating these files is to simply track the ID of the most recently uploaded/archived snapshot by virtue of the .ARCHIVE file version numbers.

Turning now to workflow 550, at the time a client wishes to determine the most recently archived snapshot for dataset 112, the client can first read the superblock chunk in cloud archive 116 and determine the latest snapshot ID recorded there (step 552). For example, the client may determine that the latest snapshot ID in the superblock is SY, where Y is some number. The client can then check whether a .ARCHIVE file exists in cloud archive file 116 with a version number corresponding to Y+1 (step 554). If not, the client can conclude that Y is the latest snapshot archived for dataset 112 (step 556).

However, if the client determines at step 554 that a .ARCHIVE file does exist with a version number corresponding Y+1, the client can set Y=Y+1 (step 558) and then return to step 554 to continue checking whether a .ARCHIVE file exists with a further incremented version number. This process can repeat for increasing values of Y until the latest version of the .ARCHIVE file is found at step 556, which identifies the most recently archived snapshot of dataset 112.

Finally, once the latest .ARCHIVE file (and thus latest snapshot) is found, the client can take an appropriate action based on this information (step 560). For example, if the client is attempting to restore the latest snapshot and determines that the latest snapshot differs from what is found in the superblock at step 552, the client may wait until the superblock properly reflects the archive metadata for the latest snapshot. Alternatively, the client may simply decide to begin restoring from the older snapshot found in the superblock.

7. Range-Based Snapshot Deletion

Since archive management agent 114 uploads successive snapshots for dataset 112 to cloud/object storage 108 in a delta manner per workflow 400 of FIG. 4, each archived snapshot after the first snapshot will not include a copy of the entirety of dataset 112; instead, that snapshot will only include a copy of the data that has changed since the immediately previous snapshot. For the remaining data of dataset 112 which has not changed, the snapshot's B+ tree will point to data chunk(s) in cloud/object storage 108 that already hold that data by virtue of being uploaded as part of one or more prior (i.e., parent) snapshots. The entire set of data chunks that are either (1) uploaded to cloud/object storage as part of a given snapshot SX or (2) are pointed to by the metadata (B+ tree) of SX but were uploaded as part of a parent snapshot are considered "referred to" by SX.

The potential dependencies between snapshots described above makes snapshot deletion from cloud/object storage 108 complicated because, at the time of deleting a particular snapshot SX, archive management agent 114 must determine which data chunks of SX can be safely removed from cloud/object storage 108 without breaking later (i.e., child) snapshots of the same dataset. Ideally, archive management agent 114 should keep all of the data chunks of snapshot SX that are referred to by child snapshots, while deleting the remaining data chunks (since those remaining data chunks are no longer needed by any snapshot in cloud/object storage 108).

One way to perform this determination is to walk the B+ tree of each child snapshot of SX, identify all of the data chunks that are referred to by the child snapshots, and mark those identified data chunks as being unsafe for deletion. The remaining data chunks of SX can then be deleted. However, walking the entire B+ tree of every child snapshot can be a time-consuming and computationally expensive process, particularly if there are a large number of child snapshots.

A more efficient approach, referred to herein as "range-based deletion," leverages the fact that in workflows 300 and 400, data chunks for snapshots are uploaded to cloud/object storage 108 according to a monotonically increasing chunk ID (e.g., data chunks 0-100 are uploaded for snapshot S0, data chunks 101-150 are uploaded for snapshot S1, data chunks 151-180 are uploaded for snapshot S2, and so on). With this monotonically increasing chunk ID property, it is possible to use the range of data chunk IDs that are referred to by each snapshot in order to quickly identify, at the time of deleting a given snapshot SX, which data chunks of SX are safe to delete (i.e., are not referred to by any other snapshots). Two implementations of this range-based deletion concept—one that supports linear deletion (i.e., deletion of snapshots in age order, from oldest to newest) and another that supports non-linear deletion (i.e., deletion of a snapshot that falls between an older snapshot and a newer snapshot)—are described in the sub-sections that follow.

7.1 Linear Deletion

Figure 6:
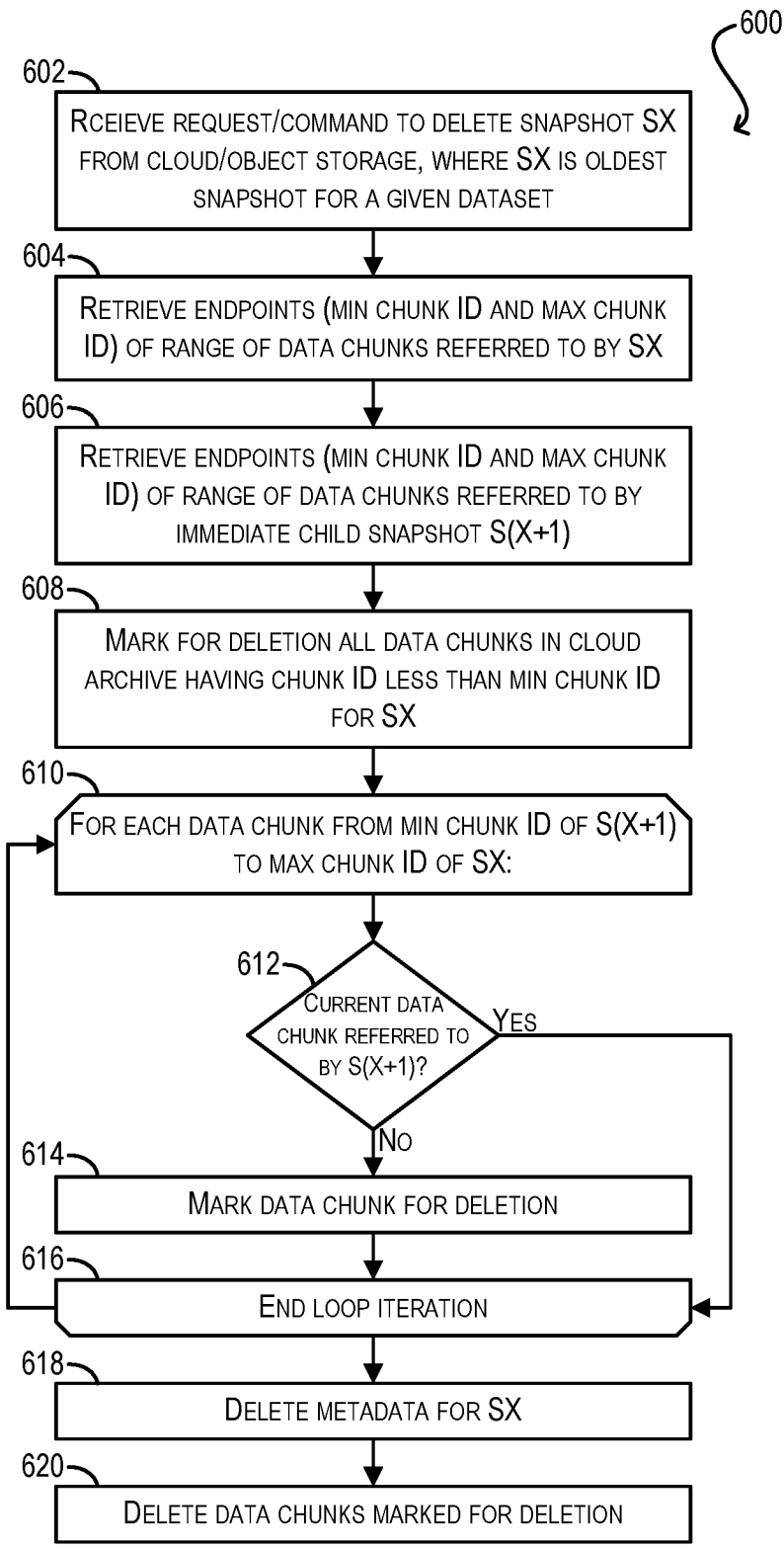
FIG. 6 depicts a workflow for implementing range-based snapshot deletion in the case of linear deletion according to an embodiment.

FIG. 6 depicts a first workflow 600 for deleting a snapshot SX from cloud/object storage 108 using range-based deletion according to an embodiment. Workflow 600 assumes that snapshots are deleted from cloud/object storage 108 in a linear fashion from oldest to newest, and thus snapshot SX is currently the oldest snapshot maintained in cloud/object storage 108 for a given dataset (e.g., dataset 112). This assumption will typically apply in scenarios where there is a cap on the maximum number of snapshots that may be held in cloud/object storage 108 for the dataset, since once the cap is reached the oldest snapshot will always be deleted at the time a new snapshot is created.

Workflow 600 also assumes that each snapshot in cloud/object storage 108 has associated metadata (stored in, e.g., the superblock of resident archive 118/cloud archive 116 or some other location) that identifies the endpoints (i.e., minimum chunk ID and maximum chunk ID) of the range of data chunks referred to by that snapshot. This range metadata may be determined and recorded as part of upload workflows 300 and 400.

Starting with block 602, archive management agent 114 can receive a request or command to delete snapshot SX of dataset 112 from cloud/object storage 108, where snapshot SX is the oldest snapshot of the dataset in storage 108. As mentioned above, in some cases this request or command may be generated because (1) a snapshot retention policy is in place that caps the maximum number of snapshots for the dataset in cloud/object storage 108 to a predefined number N, and (2) a new snapshot has been recently created that increases the total number of archived snapshots to N+1.

At block 604, archive management agent 114 can determine/retrieve the endpoints (i.e., minimum chunk ID and maximum chunk ID) of the range of data chunks in cloud/object storage 108 that are referred to by snapshot SX. This range of data chunks represent the data chunks that are needed by agent 114 in order to restore dataset 112 in its entirety from the point in time represented by snapshot SX. In a particular embodiment, agent 114 can perform this step by accessing the superblock of resident archive 118 (or cloud archive 116) and retrieving the range information from the superblock. Further, at block 606, archive management agent 114 can determine/retrieve the endpoints of the range of data chunks in cloud/object storage 108 referred to by the immediate child snapshot of SX (i.e., snapshot S(X+1)).

At block 608, archive management agent 114 can mark for deletion all data chunks that have a chunk ID less than the minimum chunk ID for snapshot SX. These data chunks are safe to delete (i.e., are not referred to by any child snapshots) because, if a child snapshot did actually refer to a lower chunk ID, the minimum chunk ID of SX itself would reflect that lower chunk ID. Stated another way, given the property of monotonically increasing chunk IDs and assuming linear deletion, it is not possible for a child snapshot of SX to refer to a data chunk that has a data chunk ID less than the minimum chunk ID of oldest snapshot SX.

Then, at block 610, archive management agent 114 can enter a loop that traverses, in ascending order, a range of data chunks that spans from the minimum chunk ID of snapshot S(X+1) to the maximum chunk ID of snapshot SX. This range identifies the set of data chunks in cloud/object storage 108 that may be referred to by SX, S(X+1), or both.

Within the loop, archive management agent 114 can check whether the data chunk identified by the current chunk ID is referred to by immediate child snapshot S(X+1) (block 612). In other words, agent 114 can check whether this data chunk is needed in order to restore dataset 112 from the point in time represented by snapshot SX. This step can be performed by, e.g., traversing the B+ tree of S(X+1) and determining whether any of the leaf nodes of the tree point to a CPBA residing in (i.e., covered by) this data chunk.

If archive management agent 114 determines that the data chunk is not referred to by immediate child snapshot S(X+1) at block 612, agent 114 can conclude that the data chunk is safe to delete and can mark the data chunk for deletion (block 614). Archive management agent 114 can then proceed to the end of the current loop iteration (block 616), and the loop can repeat as necessary.

On the other hand, if archive management agent 114 determines that the data chunk is referred to by immediate child snapshot S(X+1) at block 612, agent 114 can conclude that the data chunk is not safe to delete and can proceed directly to block 616.

Once all of the data chunks in the loop have been processed, archive management agent 114 can delete the metadata (e.g., B+ tree) maintained for snapshot SX from cloud/object storage 108 (block 618). Finally, at block 620, agent 114 can delete all of the data chunks that have been marked for deletion per blocks 608 and 614, thereby completing the deletion process.

Figure 7:
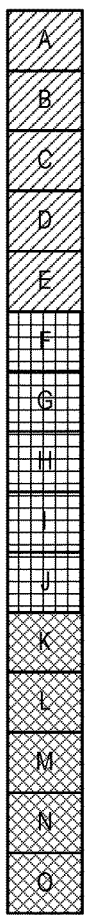
FIG. 7 depicts an example set of snapshots according to an embodiment.
Figure 7:
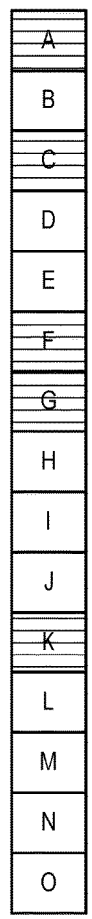
Figure 7:
Figure 7:
Figure 7:
Figure 7:
Figure 7:
Figure 7:

To better understand the processing performed by archive management agent 114 in deletion workflow 600, consider diagram 700 of FIG. 7, which depicts an example set of snapshots S0, S1, and S2 for a dataset comprising data blocks A-O according to an embodiment. In this diagram, snapshot S0 is the oldest (initial) snapshot, snapshot S1 is the second oldest, and snapshot S2 is the third oldest (i.e., newest). Further, three data chunks 1-3 have been uploaded to cloud/object storage as part of S0 (comprising data for data blocks A-E, F-J, and K-O respectively), one data chunk 4 has been uploaded as part of S1 (comprising delta data for data blocks A, C, F, G, and K), and one data chunk 5 has been uploaded as part of S2 (comprising delta data for data blocks B, D, E, H, and L). Thus, the minimum and maximum chunk IDs referred to by S0 is 1 and 3, the minimum and maximum chunk IDs referred to by S1 is 1 and 4, and the minimum and maximum chunk IDs referred to by S2, is 2 and 5.

Assume that a request/command to delete snapshot S0 in FIG. 7 is received by agent 114 in accordance with deletion workflow 600. In this scenario, there are no chunk IDs below the minimum chunk ID of S0 (chunk ID 1), and all of the data chunks between the minimum chunk ID of immediate child snapshot S1 (chunk ID 1) and the maximum chunk ID of S0 (chunk ID 3) are referred to by S1 (specifically, with respect to data blocks B, D, E, H, I, J, L, M, N, and O). Accordingly, no data chunks can be deleted at the time of deleting S0.

Now assume that a request/command to delete snapshot S1 in FIG. 7 is received by agent 114 in accordance with deletion workflow 600 (subsequent to the deletion of S0). In this scenario, there are no chunk IDs below the minimum chunk ID of S1 (chunk ID 1), and but data chunk 1 is not referred to by immediate child snapshot S2 (this is because data blocks A-E covered by data chunk 1 have all been overwritten in snapshot S1 or S2). Accordingly, data chunk 1 can be safely deleted at the time of deleting S1.

7.2 Non-Linear Deletion

Figure 8:
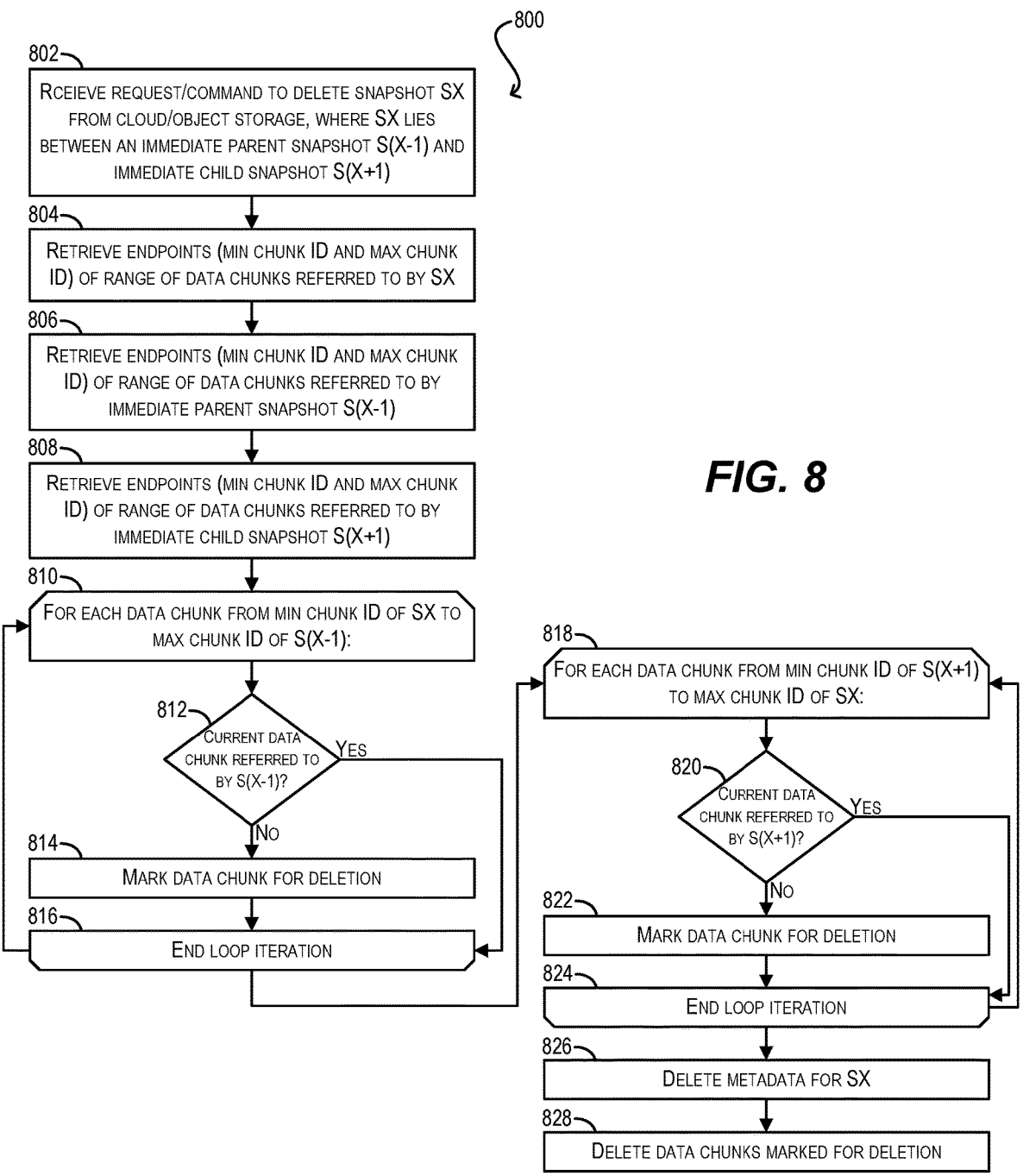
FIG. 8 depicts a workflow for implementing range-based snapshot deletion in the case of non-linear deletion according to an embodiment.

FIG. 8 depicts a second workflow 800 for deleting a snapshot SX from cloud/object storage 108 using range-based deletion according to an embodiment. In contrast to workflow 600 of FIG. 6, workflow 800 assumes that to-be-deleted snapshot SX is not the oldest snapshot for a given dataset (e.g., dataset 112) in cloud/object storage 108. In other words, there is both an immediate parent snapshot S(X−1) and immediate child snapshot S(X+1) for SX in cloud/object storage 108. Thus, workflow 800 supports non-linear deletion of snapshots. Nonlinear deletion may be needed if, for example, snapshots are uploaded on a daily basis but a retention policy requires that only weekly snapshots can be maintained in cloud/object storage 108 for long-term archival. In this scenario, if snapshots S0-S6 are created on seven consecutive days, archive management agent 114 will need to delete intermediate snapshots S1-55 while leaving S0 and S6 (which represent the weekly snapshots).

Starting with block 802, archive management agent 114 can receive a request or command to delete snapshot SX of dataset 112 from cloud/object storage 108, where snapshot SX lies temporally between an immediate parent (i.e., older) snapshot S(X−1) and an immediate child (i.e., newer) snapshot S(X+1).

At block 804, archive management agent 114 can determine/retrieve the endpoints (i.e., minimum chunk ID and maximum chunk ID) of the range of data chunks in cloud/object storage 108 that are referred to by snapshot SX. As mentioned previously, agent 114 can perform this step by accessing the superblock of resident archive 118 (or cloud archive 116) and retrieving the range information from the superblock. Further, at blocks 806 and 808, archive management agent 114 can determine/retrieve the endpoints of the range of data chunks in cloud/object storage 108 referred to by immediate parent snapshot S(X−1) and immediate child snapshot S(X+1).

At block 810, archive management agent 114 can enter a first loop that traverses, in ascending order, a range of data chunks that spans from the minimum chunk ID of to-be-deleted snapshot SX to the maximum chunk ID of immediate parent snapshot S(X−1). This range identifies the set of data chunks in cloud/object storage 108 that may be referred to by SX and/or S(X−1).

Within this first loop, archive management agent 114 can check whether the data chunk identified by the current chunk ID is referred to by immediate parent snapshot S(X−1) (block 812). In other words, agent 114 can check whether this data chunk is needed in order to restore dataset 112 from the point in time represented by snapshot S(X−1). This step can be performed by, e.g., traversing the B+ tree of S(X−1) and determining whether any of the leaf nodes of the tree point to a CPBA residing in (i.e., covered by) this data chunk.

If archive management agent 114 determines that the data chunk is not referred to by immediate parent snapshot S(X−1) at block 812, agent 114 can conclude that the data chunk is safe to delete and can mark the data chunk for deletion (block 814). Archive management agent 114 can then proceed to the end of the current loop iteration (block 816), and the first loop can repeat as necessary.

On the other hand, if archive management agent 114 determines that the data chunk is referred to by immediate parent snapshot S(X−1) at block 812, agent 114 can conclude that the data chunk is not safe to delete and can proceed directly to block 816.

Upon completion of the first loop, archive management agent 114 can subsequently enter a second loop at block 818 that traverses, in ascending order, a range of data chunks that spans from the minimum chunk ID of immediate child snapshot S(X+1) to the maximum chunk ID of to-be-deleted snapshot SX. This range identifies the set of data chunks in cloud/object storage 108 that may be referred to by SX+1 and/or SX.

Within this second loop, archive management agent 114 can check whether the data chunk identified by the current chunk ID is referred to by immediate child snapshot S(X+1) (block 820). In other words, agent 114 can check whether this data chunk is needed in order to restore dataset 112 from the point in time represented by snapshot S(X+1). This step can be performed by, e.g., traversing the B+ tree of S(X+1) and determining whether any of the leaf nodes of the tree point to a CPBA residing in (i.e., covered by) this data chunk.

If archive management agent 114 determines that the data chunk is not referred to by immediate child snapshot S(X+1) at block 820, agent 114 can conclude that the data chunk is safe to delete and can mark the data chunk for deletion (block 822). Archive management agent 114 can then proceed to the end of the current loop iteration (block 824), and the second loop can repeat as necessary.

On the other hand, if archive management agent 114 determines that the data chunk is referred to by immediate child snapshot S(X+1) at block 820, agent 114 can conclude that the data chunk is not safe to delete and can proceed directly to block 824.

Once all of the data chunks in the first and second loops have been processed, archive management agent 114 can delete the metadata (e.g., B+ tree) maintained for snapshot SX from cloud/object storage 108 (block 826). Finally, at block 828, agent 114 can delete all of the data chunks that have been marked for deletion per blocks 814 and 822, thereby completing the deletion process.

To better understand the processing performed by archive management agent 114 in deletion workflow 800, consider once again diagram 700 of FIG. 7 which depicts the example set of snapshots S0, S1, and S2. Assume that a request/command to delete snapshot S1 in FIG. 7 is received by agent 114 in accordance with deletion workflow 800. In this scenario, all of the data chunks between the minimum chunk ID of S1 (chunk ID 1) and the maximum chunk ID of S0 (chunk ID 3) are referred to by S1 (specifically, with respect to data blocks B, D, E, H, I, J, L, M, N, and O). Further, all of the data chunks between the minimum chunk ID of S2 (chunk ID 2) and the maximum chunk ID of S1 (chunk ID 4) are referred to by S2 (specifically, with respect to data blocks A, C, E, F, G, I, J, K, M, N, and O). Accordingly, no data chunks can be deleted at the time of deleting S1.

8. Batch-Based Snapshot Deletion

While range-based deletion makes the deletion of a single snapshot from cloud/object storage 108 more efficient, performance problems can still arise if snapshot deletion needs to be performed on a very frequent basis. For instance, consider a scenario where a snapshot retention policy is defined that caps the maximum number of snapshots for a given dataset in cloud/object storage 108 to a predefined number N. This means that once the maximum N is reached, one snapshot will be need to be deleted for each new snapshot that is uploaded. This can result in a very high deletion rate. For example, if a new snapshot is uploaded once an hour, an existing snapshot will also need to be deleted every hour, which can place a significant burden on the processing and bandwidth resources of the on-premises and cloud storage systems.

Figure 9:
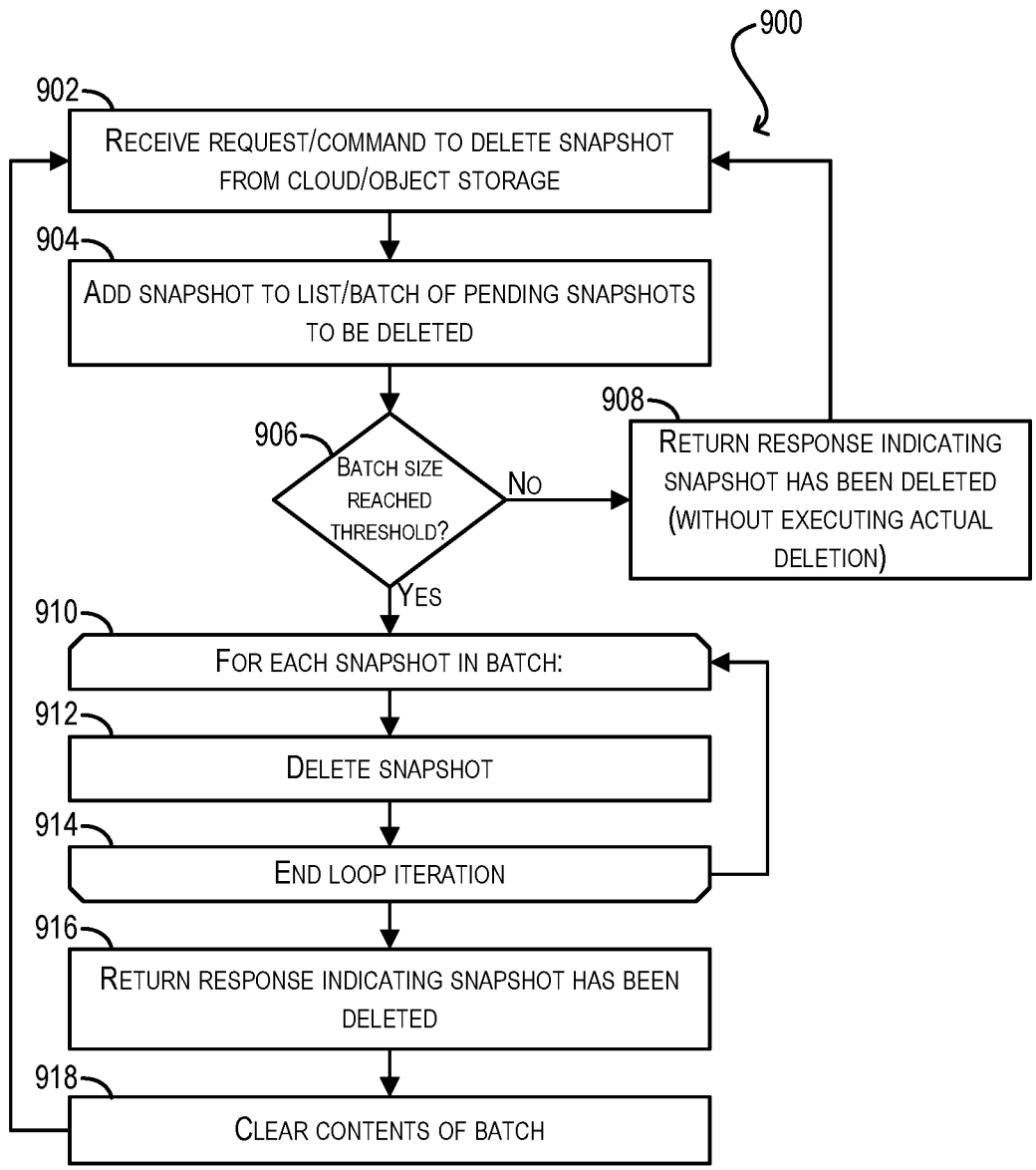
FIG. 9 depicts a workflow for implementing batch-based snapshot deletion according to an embodiment.

To address this problem, FIG. 9 depicts a workflow 900 that can be implemented by archive management agent 114 for performing batch-based snapshot deletion according to an embodiment. With batch-based deletion, there is no need for archive management agent 114 to delete snapshots for a given dataset at, e.g., the same rate at which new snapshots are uploaded; instead, agent 114 can delay the actual deletion of snapshots according to an alternative schedule. For example, archive management agent 114 may wait until it receives requests/commands to delete 20 snapshots before executing the actual deletion of those snapshots. In this way, agent 114 can space out the processing and bandwidth hit incurred by frequent snapshot deletion over longer periods of time (e.g., once a week rather than once a day).

Starting with block 902, archive management agent 114 can receive a request or command to delete a snapshot of dataset 112 from cloud/object storage 108. Upon receiving this request/command, archive management agent 114 can add the snapshot to a list or batch of "pending snapshots to be deleted" (block 904) and can check whether the size of the batch has reached a predefined threshold (block 906). If the answer is no, agent 114 can return a response to the originator of the request/command indicating that the snapshot has been deleted from cloud/object storage 108, but refrain from taking any steps to actually carry out the deletion (block 908). As part of this step, archive management agent 114 may designate the snapshot as "pending delete" (or use some other similar designation) in cloud/object storage 108. Agent 114 can then return to block 902 in order to wait for and receive additional snapshot deletion requests/commands.

However, if the size of the batch has reached the threshold at block 906, archive management agent 114 can enter a loop for each snapshot included in the batch (block 910). Archive management agent 114 can then delete the snapshot from cloud/object storage 108 using any appropriate deletion algorithm (block 912), reach the end of the current loop iteration (block 914), and repeat the loop until all snapshots have been processed.

Upon completing the loop, archive management agent 114 can return a response to the originator of the request/command indicating that the snapshot has been deleted from cloud/object storage 108 (block 916) and can clear the contents of the batch (block 918). Finally, agent 114 can return to block 902 to wait for and receive additional snapshot deletion requests/commands.

It should be appreciated that workflow 900 is illustrative and that various modifications are possible. For example, although the threshold that is used at block 906 to determine whether to delete the batch of pending snapshots is described as a "predefined" threshold, in some embodiments this threshold may be determined/computed dynamically at the time of reaching block 906. For example, archive management agent 114 may use one or more heuristics to determine, on a continuous basis, what the most appropriate value for this threshold should be based on the current runtime conditions of client system 102 and/or cloud/object storage system 108.

Figure 10:
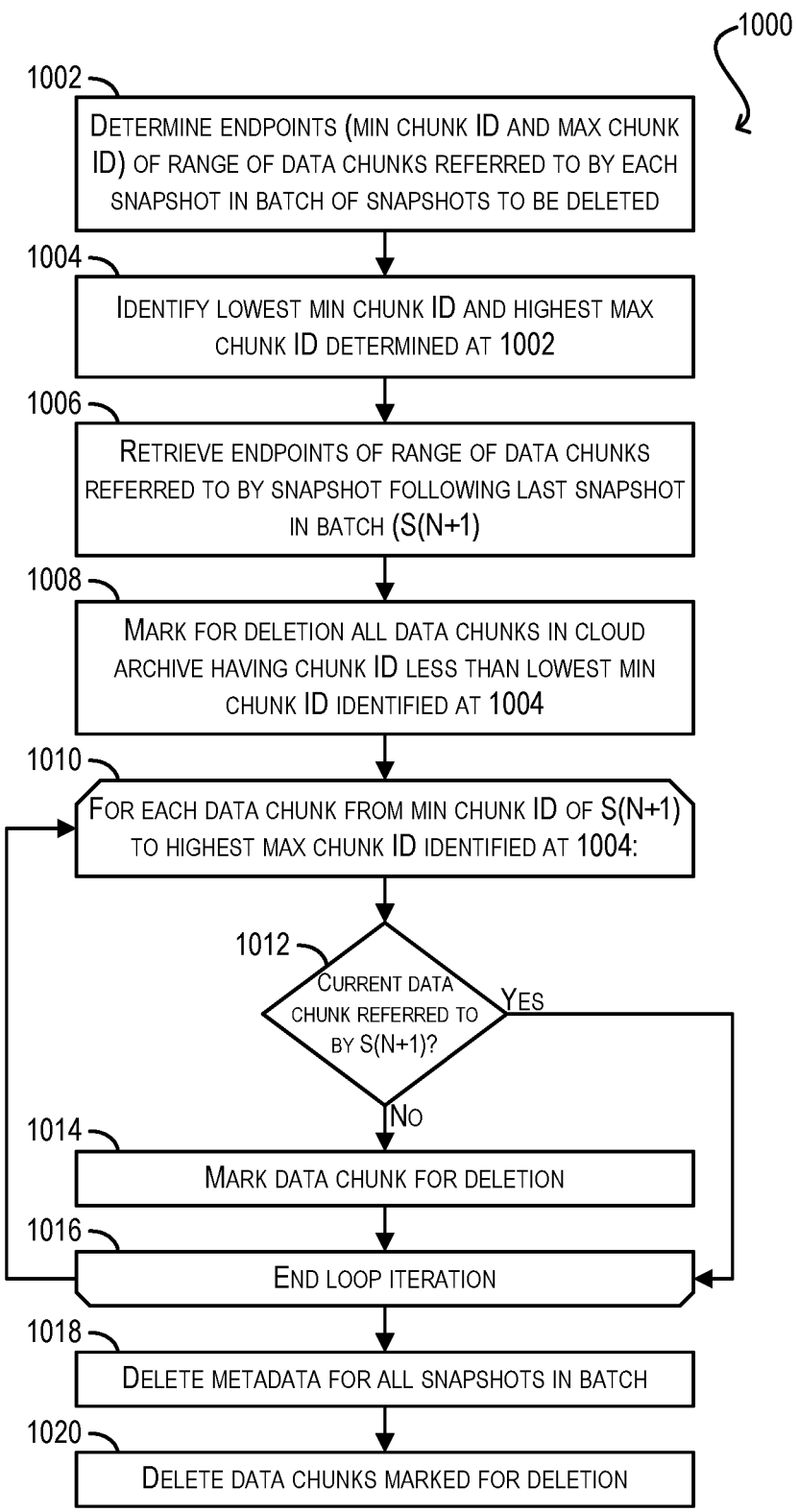
FIG. 10 depicts a workflow for implementing batch-based snapshot deletion in a manner that leverages range-based deletion according to an embodiment.

Further, as part of deleting the snapshots in the batch at blocks 910-914, archive management agent 114 can optionally leverage a range-based technique that is similar to the range-based deletion mechanism described in Section 7 of the present disclosure. With this technique, archive management agent 114 can use the entire range of data chunks referred to by the batched snapshots (i.e., the minimum chunk ID and maximum chunk ID across all of the batched snapshots) in order to efficiently determine which data chunks are safe to delete from cloud/object storage 108. This process is shown as workflow 1000 in FIG. 10. Workflow 1000 assumes that the batch size is N and that linear deletion is in effect (i.e., the batch includes successive snapshots that are all older than snapshot S(N+1)).

At block 1002, archive management agent 114 can first determine the endpoints (minimum chunk ID and maximum chunk ID) of the range of data chunks referred to by each snapshot in the batch of pending snapshots to be deleted. For example, one snapshot in the batch may refer to a range of 1 to 10, another snapshot may refer to a range of 4 to 15, and so on.

At block 1004, archive management agent 114 can identify the lowest minimum chunk ID determined at block 1002, as well as the highest maximum chunk ID determined at block 1002. This represents the referred-to range of the entire batch. In addition, at block 1006, archive management agent 114 can determine/retrieve the endpoints of the range of data chunks in cloud/object storage 108 referred to by snapshot S(N+1) (i.e., the snapshot immediately following the last snapshot in the batch).

At block 1008, archive management agent 114 can mark for deletion all data chunks that have a chunk ID less than the batch-wide minimum chunk ID determined at block 1004.

Then, at block 1010, archive management agent 114 can enter a loop that traverses, in ascending order, a range of data chunks that spans from the minimum chunk ID of snapshot S(N+1) to the batch-wide maximum chunk ID determined at block 1004.

Within this loop, archive management agent 114 can check whether the data chunk identified by the current chunk ID is referred to by snapshot S(N+1) (block 1012). In other words, agent 114 can check whether this data chunk is needed in order to restore dataset 112 from the point in time represented by snapshot S(N+1). This step can be performed by, e.g., traversing the B+ tree of S(N+1) and determining whether any of the leaf nodes of the tree point to a CPBA residing in (i.e., covered by) this data chunk.

If archive management agent 114 determines that the data chunk is not referred to by immediate child snapshot S(N+1) at block 1012, agent 114 can conclude that the data chunk is safe to delete and can mark the data chunk for deletion (block 1014). Archive management agent 114 can then proceed to the end of the current loop iteration (block 1016), and the loop can repeat as necessary.

On the other hand, if archive management agent 114 determines that the data chunk is referred to snapshot S(N+1) at block 1012, agent 114 can conclude that the data chunk is not safe to delete and can proceed directly to block 1016.

Once all of the data chunks in the loop have been processed, archive management agent 114 can delete the metadata (e.g., B+ tree) maintained for all of the snapshots in the batch from cloud/object storage 108 (block 1018). Finally, at block 1020, agent 114 can delete all of the data chunks that have been marked for deletion per blocks 1008 and 1014, thereby completing the deletion of the batch.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for performing range-based deletion of snapshots archived in cloud/object storage, the method comprising:
   receiving, by a computer system, a request or command to delete a first snapshot from among a plurality of snapshots of a dataset, the plurality of snapshots being stored in the cloud/object storage;
   determining, by a computer system, a first minimum chunk identifier (ID) and a first maximum chunk ID associated with the first snapshot, wherein the first minimum chunk ID and the first maximum chunk ID correspond to endpoints of a first range of data chunks in the cloud/object storage that are needed to restore the dataset in its entirety from a first point in time represented by the first snapshot;
   determining, by the computer system, a second minimum chunk ID and a second maximum chunk ID associated with a second snapshot in the plurality of snapshots, wherein the second snapshot is an immediate child snapshot of the first snapshot, and wherein the second minimum chunk ID and the second maximum chunk ID correspond to endpoints of a second range of data chunks in the cloud/object storage that are needed to restore the dataset in its entirety from a second point in time represented by the second snapshot; and
   for each data chunk in the cloud/object storage identified by a chunk ID spanning from the second minimum chunk ID to the first maximum chunk ID:
      checking, by the computer system, whether the data chunk is needed to restore the dataset from the second point in time; and
      if the data chunk not needed to restore the dataset from the second point in time, deleting the data chunk from the cloud/object storage.

2. The method of claim 1 further comprising:
   if the data chunk is needed to restore the dataset from the second point in time, refraining from deleting the data chunk from the cloud/object storage.

3. The method of claim 1 wherein the plurality of snapshots are uploaded to the cloud/object storage as a sequence of data chunks having monotonically increasing chunk IDs.

4. The method of claim 1 wherein the first snapshot is the oldest snapshot in the plurality of snapshots.

5. The method of claim 4 further comprising:
   deleting all data chunks in the cloud/object storage identified by a chunk ID that is less than the first minimum chunk ID.

6. The method of claim 1 further comprising:
   determining a third minimum chunk ID and a third maximum chunk ID associated with a third snapshot in the plurality of snapshots, wherein the third snapshot is an immediate parent snapshot of the first snapshot, and wherein the third minimum chunk ID and the third maximum chunk ID correspond to endpoints of a third range of data chunks in the cloud/object storage that are needed to restore the dataset in its entirety from a third point in time represented by the third snapshot.

7. The method of claim 6 further comprising:
   for each data chunk in the cloud/object storage identified by a chunk ID spanning from the first minimum chunk ID to the third maximum chunk ID:
      checking whether the data chunk is needed to restore the dataset from the third point in time; and
      if the data chunk not needed to restore the dataset from the third point in time, deleting the data chunk from the cloud/object storage.

8. A non-transitory computer readable storage medium having stored thereon program code executable by a computer system, the program code embodying a method for performing range-based deletion of snapshots archived in cloud/object storage, the method comprising:
   receiving a request or command to delete a first snapshot from among a plurality of snapshots of a dataset, the plurality of snapshots being stored in the cloud/object storage;
   determining a first minimum chunk identifier (ID) and a first maximum chunk ID associated with the first snapshot, wherein the first minimum chunk ID and the first maximum chunk ID correspond to endpoints of a first range of data chunks in the cloud/object storage that are needed to restore the dataset in its entirety from a first point in time represented by the first snapshot;
   determining a second minimum chunk ID and a second maximum chunk ID associated with a second snapshot in the plurality of snapshots, wherein the second snapshot is an immediate child snapshot of the first snapshot, and wherein the second minimum chunk ID and the second maximum chunk ID correspond to endpoints of a second range of data chunks in the cloud/object storage that are needed to restore the dataset in its entirety from a second point in time represented by the second snapshot; and
   for each data chunk in the cloud/object storage identified by a chunk ID spanning from the second minimum chunk ID to the first maximum chunk ID:
      checking whether the data chunk is needed to restore the dataset from the second point in time; and if the data chunk not needed to restore the dataset from the second point in time, deleting the data chunk from the cloud/object storage.

9. The non-transitory computer readable storage medium of claim 8 wherein the method further comprises:
if the data chunk is needed to restore the dataset from the second point in time, refraining from deleting the data chunk from the cloud/object storage.

10. The non-transitory computer readable storage medium of claim 8 wherein the plurality of snapshots are uploaded to the cloud/object storage as a sequence of data chunks having monotonically increasing chunk IDs.

11. The non-transitory computer readable storage medium of claim 8 wherein the first snapshot is the oldest snapshot in the plurality of snapshots.

12. The non-transitory computer readable storage medium of claim 11 wherein the method further comprises:
deleting all data chunks in the cloud/object storage identified by a chunk ID that is less than the first minimum chunk ID.

13. The non-transitory computer readable storage medium of claim 8 wherein the method further comprises:
determining a third minimum chunk ID and a third maximum chunk ID associated with a third snapshot in the plurality of snapshots, wherein the third snapshot is an immediate parent snapshot of the first snapshot, and wherein the third minimum chunk ID and the third maximum chunk ID correspond to endpoints of a third range of data chunks in the cloud/object storage that are needed to restore the dataset in its entirety from a third point in time represented by the third snapshot.

14. The non-transitory computer readable storage medium of claim 13 wherein the method further comprises:
for each data chunk in the cloud/object storage identified by a chunk ID spanning from the first minimum chunk ID to the third maximum chunk ID:
checking whether the data chunk is needed to restore the dataset from the third point in time; and
if the data chunk not needed to restore the dataset from the third point in time, deleting the data chunk from the cloud/object storage.

15. A computer system comprising:
a processor; and
a non-transitory computer readable medium having stored thereon program code that, when executed, causes the processor to:
receive a request or command to delete a first snapshot from among a plurality of snapshots of a dataset, the plurality of snapshots being stored in cloud/object storage;
determine a first minimum chunk identifier (ID) and a first maximum chunk ID associated with the first snapshot, wherein the first minimum chunk ID and the first maximum chunk ID correspond to endpoints of a first range of data chunks in the cloud/object storage that are needed to restore the dataset in its entirety from a first point in time represented by the first snapshot;

determine a second minimum chunk ID and a second maximum chunk ID associated with a second snapshot in the plurality of snapshots, wherein the second snapshot is an immediate child snapshot of the first snapshot, and wherein the second minimum chunk ID and the second maximum chunk ID correspond to endpoints of a second range of data chunks in the cloud/object storage that are needed to restore the dataset in its entirety from a second point in time represented by the second snapshot; and
for each data chunk in the cloud/object storage identified by a chunk ID spanning from the second minimum chunk ID to the first maximum chunk ID:
check whether the data chunk is needed to restore the dataset from the second point in time; and
if the data chunk not needed to restore the dataset from the second point in time, delete the data chunk from the cloud/object storage.

16. The computer system of claim 15 wherein the program code further causes the processor to:
if the data chunk is needed to restore the dataset from the second point in time, refrain from deleting the data chunk from the cloud/object storage.

17. The computer system of claim 15 wherein the plurality of snapshots are uploaded to the cloud/object storage as a sequence of data chunks having monotonically increasing chunk IDs.

18. The computer system of claim 15 wherein the first snapshot is the oldest snapshot in the plurality of snapshots.

19. The computer system of claim 18 wherein the program code further causes the processor to:
delete all data chunks in the cloud/object storage identified by a chunk ID that is less than the first minimum chunk ID.

20. The computer system of claim 15 wherein the program code further causes the processor to:
determine a third minimum chunk ID and a third maximum chunk ID associated with a third snapshot in the plurality of snapshots, wherein the third snapshot is an immediate parent snapshot of the first snapshot, and wherein the third minimum chunk ID and the third maximum chunk ID correspond to endpoints of a third range of data chunks in the cloud/object storage that are needed to restore the dataset in its entirety from a third point in time represented by the third snapshot.

21. The computer system of claim 20 wherein the program code further causes the processor to:
for each data chunk in the cloud/object storage identified by a chunk ID spanning from the first minimum chunk ID to the third maximum chunk ID:
check whether the data chunk is needed to restore the dataset from the third point in time; and
if the data chunk not needed to restore the dataset from the third point in time, delete the data chunk from the cloud/object storage.

* * * * *